US007324536B1

(12) United States Patent
Holtey et al.

(10) Patent No.: US 7,324,536 B1
(45) Date of Patent: Jan. 29, 2008

(54) QUEUE SCHEDULING WITH PRIORITY AND WEIGHT SHARING

(75) Inventors: Thomas Holtey, Newton, MA (US); Xiaohui Zhang, Billerica, MA (US); Victor Firoiu, Westford, MA (US); Eric Haversat, Tewksbury, MA (US); Gregory E. Lund, Eau Claire, WI (US)

(73) Assignee: Nortel Networks Limited (CA)

( * ) Notice: Subject to any disclaimer, the term of this patent is extended or adjusted under 35 U.S.C. 154(b) by 953 days.

(21) Appl. No.: 10/606,560

(22) Filed: Jun. 26, 2003

(51) Int. Cl.
*H04L 12/54* (2006.01)

(52) U.S. Cl. ...................................... 370/412; 370/429
(58) Field of Classification Search ........ 370/412–418, 370/428, 429, 459; 709/223–225
See application file for complete search history.

(56) References Cited

U.S. PATENT DOCUMENTS

| | | | | |
|---|---|---|---|---|
| 6,259,699 B1 * | 7/2001 | Opalka et al. | ............. | 370/398 |
| 6,603,747 B2 * | 8/2003 | Asai | ......................... | 370/322 |
| 6,839,358 B2 * | 1/2005 | Abiru et al. | ................ | 370/413 |
| 7,002,918 B1 * | 2/2006 | Prieto et al. | ................ | 370/252 |
| 2002/0044563 A1 * | 4/2002 | Magill et al. | ............... | 370/411 |

* cited by examiner

*Primary Examiner*—Wing Chan
*Assistant Examiner*—Duc Duong
(74) *Attorney, Agent, or Firm*—McGuiness & Manaras LLP

(57) ABSTRACT

A Balanced Packet Transmit Opportunity (BPTO) mechanism allows balanced bandwidth traffic to be serviced while still maintaining the service levels desired for high priority traffic. The above embodiment achieved the result by distinguishing both queue types and slot style types, and performing selections differently depending upon the relative styles of the queues and slots. This arrangement provides a number of advantages. Because the selection method is fast and relatively simple to implement, a large number of queues may be integrated into the decision process while maintaining a desired output bandwidth. In addition, the selection process provides a flexibility, allowing multiple traffic shaping considerations to be modified during operations to support changing network requirements. In addition, the selection process provides a flexibility, allowing multiple traffic shaping considerations to be modified during operations to support changing network requirements.

21 Claims, 6 Drawing Sheets

Figure 5

Prior Art

QUEUE SCHEDULING WITH PRIORITY AND WEIGHT SHARING

FIELD OF THE INVENTION

This invention relates generally to the field of data processing and more particularly to a method and apparatus for queuing in a high speed environment.

BACKGROUND OF THE INVENTION

There are many environments in which data needs to be transferred from a source to a destination at high speed with accuracy. For example, computer networks are one such environment. A network topology generally consists of a number of network devices, such as personal computer, routers, switches, etc. interconnected via a carrier such as a twisted-pair cable, fiber optic cable, T1 or T3 line, or the like. Technological advances are continually increasing the bandwidth capabilities of carriers. While in 1980 the maximum bandwidth of carriers was only 2400 bits per second, today optical carriers are capable of supporting a range of 1 to 13 Gigabits per second. The exponential advance in carrier capability has put a burden on the manufacturers of network devices to provide components that are capable of utilizing the available bandwidth.

Typical network devices include a line card that interfaces to the carrier for controlling the transmission of data between the network device and the carrier. Some data is processed by the receiving network device, while other data is merely transferred through the network device. Queuing mechanisms are generally included in the line card for storing received data while it is determined how the data should be processed. It is important that data which is received from the carrier at the high speed line rate is handled appropriately by the receiving device. For example, queues may be assigned to different types of traffic that is destined for the network device to allow the device to process higher priority data first.

Various methods have been developed for cycling through the queues to obtain packets for processing by the network device. For example, queues may be selected by the use of a round robin selection criteria or priority based scheduling. Each of these methods of queue scheduling has their drawbacks. While strict round robin scheduling mechanisms are relatively simple to implement, they may frustrate the servicing of high priority data traffic. Alternatively while priority based scheduling may permit quality of service (QoS) to be maintained, often priority mechanisms increase both the hardware complexity of the selection criteria and the buffering needs for lower priority queues. It would be desirable to determine a method of queue selection that would minimize hardware complexity while assuring quality of service constraints are met for various types of traffic.

SUMMARY OF THE INVENTION

According to one embodiment of the invention, a method for selecting one of a plurality of data sources as a source of data is disclosed, where the data sources are apportioned into a first types of data source and a second type of data source. The method includes the steps of providing a vector for each one of the plurality of data sources. The vector is a series of N bits, where each bit corresponds to one of N time slots and represents whether the associated one of the plurality of data sources is assigned to the corresponding time slot. The method includes the step of determining, for each time slot, a slot style of the time slot, and selecting, at each time slot, one of the plurality of data sources as the source of data, the step of selecting operating in response to the slot style of the time slot.

According to another aspect of the invention, a data structure for storage in a computer readable medium on a device is disclosed, wherein the data structure is for use in selecting one of a plurality of inputs as an output. The data structure includes, for each one of the plurality of inputs, a vector having a series of N bits. Each bit corresponds to a time slot for transmission of the output for indicating whether the input is assigned to the respective time slot. The data structure also includes a style field, for indicating a style of the input, wherein the style is selected from at least two styles.

According to another aspect of the invention, a selector for selecting one of a plurality of inputs to provide an output is disclosed. The selector includes a control data structure comprising, for each one of the inputs, a vector having a series of N bits, each bit corresponding to one of a plurality of time slots, for indicating whether the input is assigned to the respective time slot for transmission. The control data structure also includes a style field, for indicating a style of the input, wherein the style is selected from at least two styles; and a slot style vector, the slot style vector comprising N bits, each bit corresponding to one of the plurality of time slots, for indicating a type of the time slot, means, responsive to the vector, the style field and the slot style vector, for selecting one of the plurality of inputs to provide an output for each time slot.

According to a further aspect of the invention, a queueing system is disclosed. The queueing system includes a plurality of queues, each queue having a type associated therewith and a selector, coupled to the plurality of queues. The selector selects one of the plurality of queues to provide data to an output. The selector includes a control structure including a vector comprising a number of bits corresponding to a number of time slots, wherein each of the time slots has a type associated therewith, wherein a set of the plurality of queues are assigned to each of the time slots, and wherein the selector selects one of the plurality of queues to provide an output for each time slot based on the type of the each time slot and the type of the queue.

According to a further aspect of the invention, a network line card includes an ingress data path for forwarding a packet from a device to a fabric and an egress data path for forwarding a packet from a fabric to a device. The egress data path includes a queueing system including a plurality of queues, each queue having a type associated therewith and a selector, coupled to the plurality of queues. The selector selects one of the plurality of queues to provide data to an output, and includes a control structure including a vector comprising a number of bits corresponding to a number of time slots, wherein each of the time slots has a type associated therewith. A set of the plurality of queues are assigned to each of the time slots, and the selector selects one of the plurality of queues to provide an output for each time slot based on the type of the each time slot and the type of the queue. With such an arrangement, balanced bandwidth traffic to be serviced while still maintaining the service levels desired for high priority traffic.

BRIEF DESCRIPTION OF THE DRAWINGS

FIG. 5 is a diagram illustrating time slot selection according to a prior art queue selection process.

DESCRIPTION OF THE PREFERRED EMBODIMENT

Figure 1:
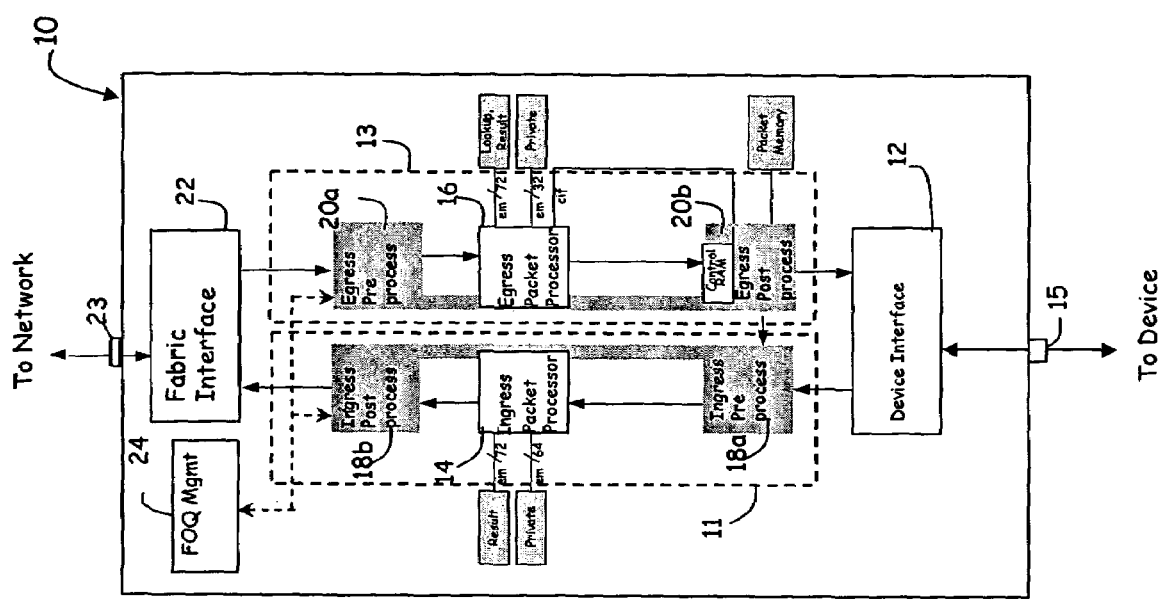
FIG. 1 is an exemplary block diagram of a network line card in which the scheduling mechanism of the present invention may be used.

Referring now to FIG. 1, an example is shown of a subset of components that may be provided in a data path of a network line card 10. An ingress, or transmit, packet processing path 11 receives packets from a network device, such as a Media Access Control (MAC) or PHY device, via device interface 12 and input port 15 and forwards the packets to a network fabric (not shown) via the fabric interface 22 and fabric port 23. An egress, or transmit, packet processing path 13 receives packets from the fabric interface 22 and port 23 and forwards the packets to the coupled network device via device interface 12. Although for purposes of simplicity only fabric port 23 and network device port 15 are shown in FIG. 1 it is understood that typical line cards include multiple fabric ports and device ports, and the present invention is not limited to a line card that offers any particular port configuration. It is understood that a typical line card may include any number of additional components, but for the purposes of the discussion of the present invention the following specification focuses on the components in the packet processing paths 11 and 13. In FIG. 1, the ingress pre processing logic 18a and ingress post processing logic 18b, as well as the egress pre processing logic 20a and egress post processing logic 20b are each shown as one physical entity, for example implemented in a common ASIC. However, upon reading of the disclosure below it will become apparent that the functionality may be implemented in any form of hardware components, or a combination of software and hardware, and the present invention is not limited to the structures shown in FIG. 1.

In the embodiment of FIG. 1, the ingress processing path 11 is shown to include an ingress packet processor 14 and ingress logic 18 comprising ingress pre processing logic 18a and ingress post processing logic 18b. Some tasks that may be performed by the ingress pre processing logic include packet collection and pre-classification (where information regarding the address of protocol of the packet may be extracted prior to transfer of the packet to the packet processor). The ingress packet processor 14 generally includes functionality to provide fast switching of the received packet, to determine whether to forward the packet to an appropriate output port or network device. Exemplary functionality of the ingress packet processor 14 thus includes logic to execute lookups, perform filtering and classification operations and modify IP and MAC headers within the body of the packet to reflect routing and switching decisions. The processor further generates information that is needed to complete packet processing, such as determining the packet's class, and determine information for forwarding the packet to the appropriate egress port of the line card.

The ingress post processing logic 18b receives packets from the processor 14. If it is determined that the packet is to be transmitted over the fabric, the ingress post processing logic 18b segments the packet according to a protocol of the associated fabric, completing and formatting the cell and packet headers, and forwards the packet to the fabric interface 22.

Egress logic 20 is shown to include egress pre processing logic 20a and egress post processing logic 20b. Egress pre processing logic 20a reassembles packets received from fabric interface 22 and forwards packets to the egress packet processor 16. The egress packet processor may perform a variety of functions including encapsulation of the packet. The egress packet processor then forwards the packet to one of a selection of queues in the egress post processor logic 20b.

According to one aspect of the invention, the egress post processing logic 16 includes a constellation of egress queues. Information from the egress packet processor 16, MAC and IP headers and Quality of Service (QoS) bits from the packet header are used to specify one of a selection of egress queues for storage of a packet.

Figure 2:
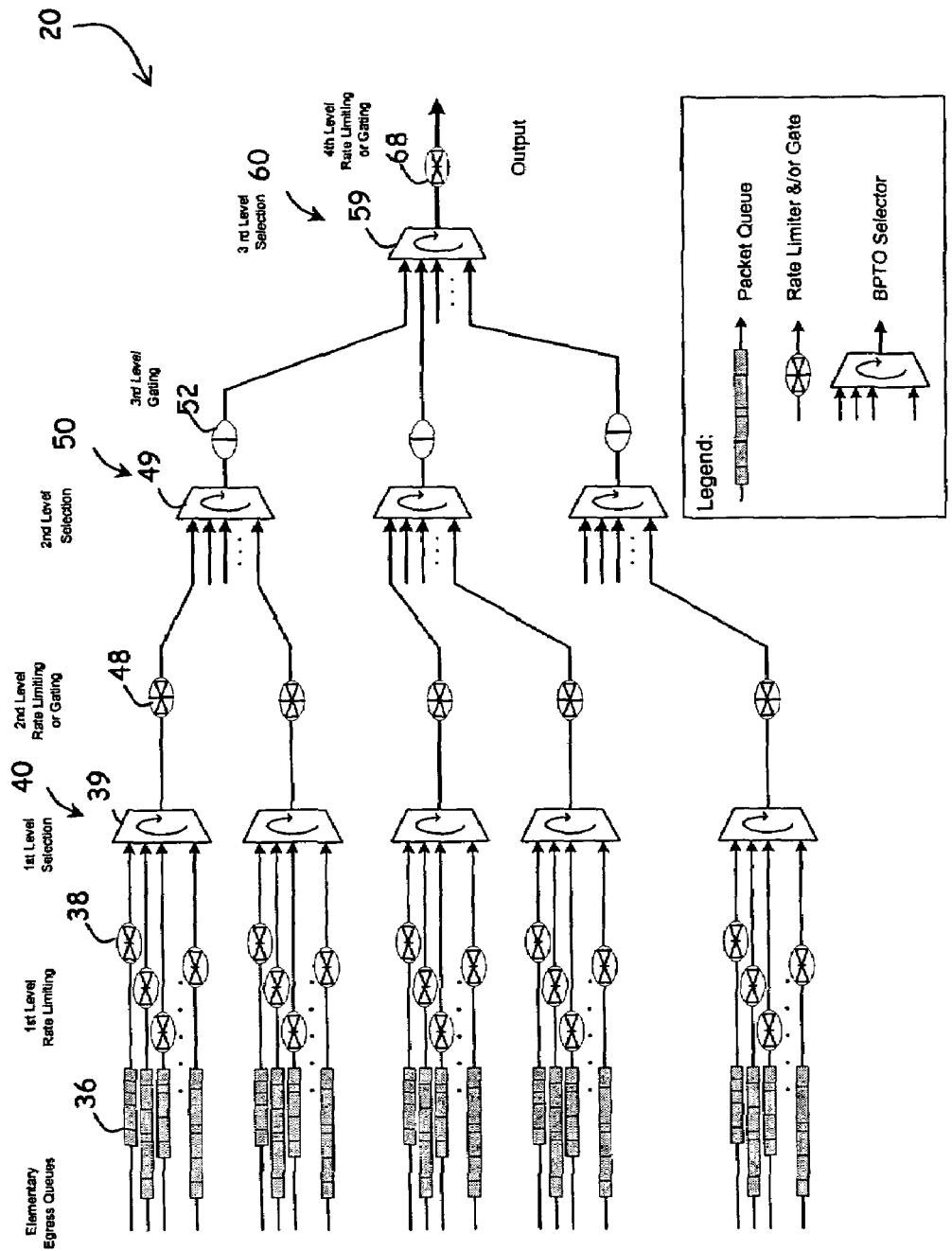
FIG. 2 is a block diagram illustrating one arrangement of nested queues that may be provided in the line card of FIG. 1.

Referring now to FIG. 2, an exemplary arrangement of egress queues is shown. According to one aspect of the invention, a queue scheduling algorithm referred to hereinafter as Balanced Packet Transmit Opportunity (BPTO) is used to manage both priority queues and weight-sharing (or balanced bandwidth) queues in the egress port of a high speed network line card. The BPTO described below permits simultaneous scheduling of priority and balanced bandwidth queues within one scheduler. In doing so, multiple stages of arbitration and complexity are eliminated, thereby allowing the number of queues that may be controlled by the scheduler to increase while meeting both speed and fairness requirements of the queue design.

The queuing structure of FIG. 2 is shown to include three selection levels, first selection level 40, second selection level 50 and third selection level 60. At each selection level a selector, such as selector 39, selects from one of N inputs, where herein N is equal to eight. The present invention deals with the operation of each individual selector in selecting one of the N inputs as an output.

A first level rate limiter 38 is advantageously disposed between each egress queue and its coupled selector. The rate limiter controls packet exit from the egress queue. Basically, a packet is allowed to pass the rate limiter if the Credit of its associated queue Descriptor is positive, and physical flow control for the queue has not been disabled. The Credit of the queue is initially set to zero, and augmented periodically by the Credit Augment function up to the Credit Limit. When a packet is dequeued, the Length of the packet is subtracted from the Credit. The rate limiter thus provides a minimal level of flow control from the queues. In one embodiment, the queue descriptor values are programmable, so that the Credit Augments and Credit Limits may be changed to prevent queue starvation and the like. While the provision of a rate limiter in the manner shown in FIG. 2 is advantageous to the present invention, the present invention is not limited to a system that includes rate limiters disposed between the selectors and the queues.

After the packet passes the rate limiter 38, it is forwarded to the selector 39. For the purposes of this application, it is assumed that the selector selects one of the eight inputs during a time period referred to as an opportunity time slot.

In general, an opportunity timeslot is the time that is used to transfer one Quantum of information, which may be one packet or more (depending upon the deficit round robin Quantum definition), from the egress queue to the device interface 12. The actual time period of an opportunity timeslot may vary depending upon the length of the packet that is transmitted.

As mentioned above, BPTO handles both balanced bandwidth queues and priority queues with one scheduler. Thus, the present invention defines each queue as one of either a priority, balanced bandwidth or best effort. The packet type of each queue is defined by setting appropriate bits in a queue descriptor associated with the respective queue.

Figure 3:
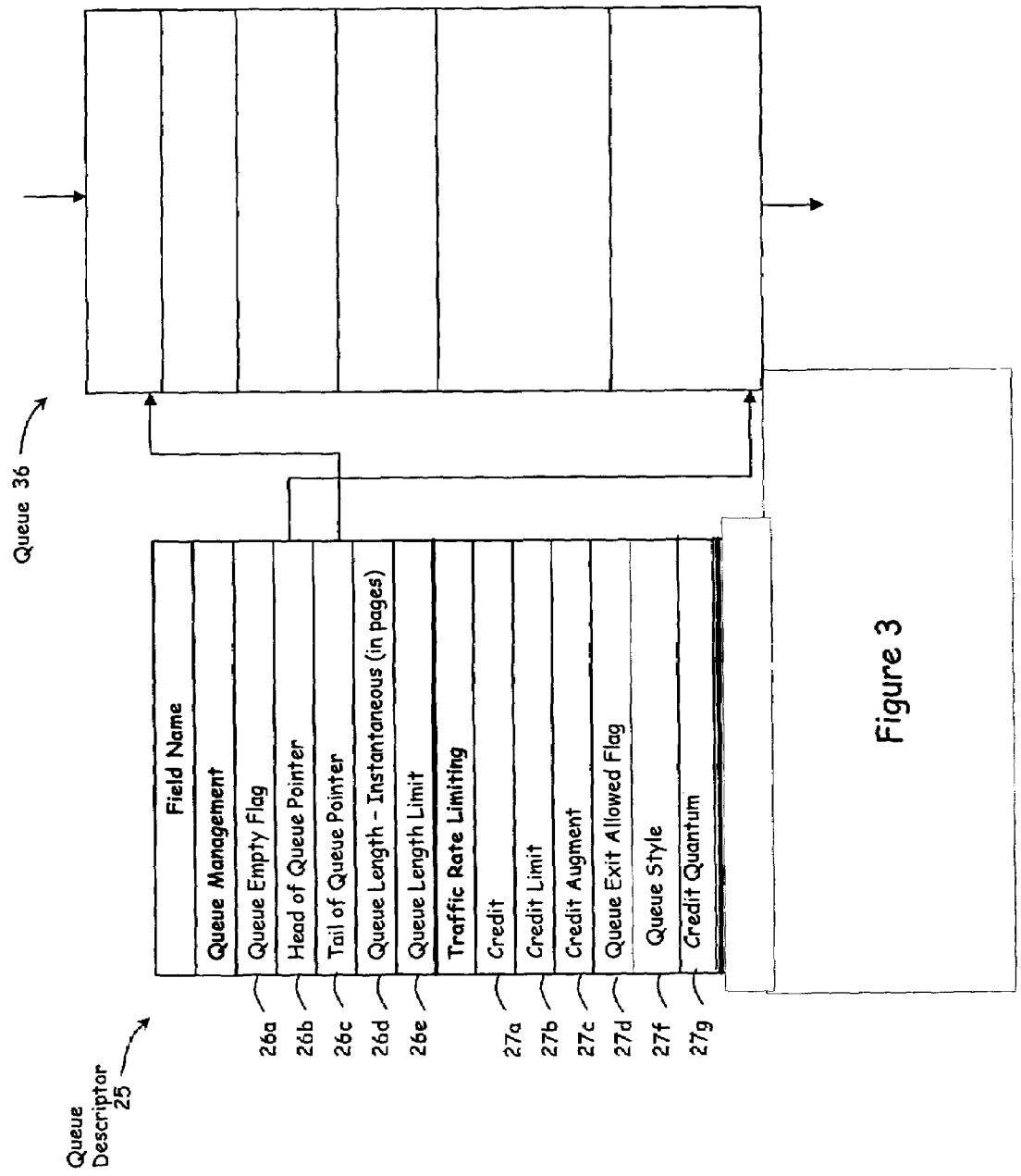
FIG. 3 is a diagram illustrating a packet queue and an exemplary queue descriptor including fields for controlling the packet queue, where the queue may be a queue in the nested queues of FIG. 2.

Referring now to FIG. 3, a packet queue 36 is comprised of a linked list of packets stored in a packet memory. The packets are arranged in First-In, First Out order within the queue. Associated with each queue is a queue descriptor, such as queue descriptor 25. A queue descriptor includes a variety of fields that are used to identify various characteristics of the queue. In FIG. 3, the fields are shown to include fields for controlling queue management and limiting traffic rate, although other fields may also be provided, and the present invention is not limited to any specific queue descriptor architecture. Exemplary queue management fields include Queue Empty Flag 26a for indicating when the associated queue is empty, Head of Queue Pointer 26b, which is the pointer to the first packet in the associated queue; Tail of Queue Pointer 26c, which is the pointer to the last packet in the linked list of the queue; the Queue Length 26d, which identifies the number of bytes of data in the queue; and the queue length limit 26e, which is the size limit for the associated queue, (i.e., no more packets can enter the queue if the length is exceeded by its entry).

Fields that are used in the present invention for traffic rate limiting include a Credit field 27a, a Credit Limit field 27b, a Credit Quantum field 27c, a Queue Exit Allowed Flag 27d, a Credit Update Synchronization flag 27e, and a Queue Style field 27f. A general description of these fields is provided below, with a more detailed description provided later herein.

The Credit field 27a, Credit Limit field 27b and Credit augment field 27c are used to control the rate of output of packets from the queue for rate limiting purposes. The Credit Quantum field 27g is used with to control queue selection for balanced bandwidth queues according to known deficit round robin techniques. When the value in the Credit Field 27a is positive, the Queue Exit allowed flag 27d is set. The Queue Style field 27f is used to identify a type of queue, for example a priority type queue or a balanced bandwidth queue. How the queue style field 27f is used in the BPTO selection mechanism is described later herein.

During each transmit opportunity, selector 39 selects a packet from one of the N inputs (where N=eight in the example of FIG. 2) to provide to the next selection level. The method according to the present invention that is used to select the one packet is referred to as Balanced Packet Transmit Opportunity (BPTO). According to BPTO, selection is made such that high priority traffic is serviced while bandwidth is balanced between lower priority traffic, thereby ensuring fairness. BPTO achieves this by classifying the queues into three types; priority queues, balanced queues, and best effort queues. Priority queues are those queues that store traffic having the highest Quality of Service (QoS) requirements, or those queues that store network control packets. Balanced queues are queues having a lower priority but certain QoS requirements. Best effort queues are those queues having the lowest priority, and are serviced when Priority and Balanced queues are empty.

According to one embodiment of the invention, Balanced queues are queues that have certain bandwidth requirements, perhaps set according to a Service Level Agreement (SLA). Thus, the balanced queues need to maintain a certain bandwidth at their output. The bandwidth is generally apportioned between the queues, which each queue being given their 'share'. One method known in the art for determining share is through the use of deficit round robin (DRR) selection. In DRR, each queue is assigned a percentage of the traffic, and maintains a Credit value. The queue can only transmit when the Credit value is positive, and the Credit value is decreased by the Length of the packet transmitted. Each time the queue has an opportunity to transmit a packet, a Quantum value (representing the percentage value assigned to the queue) is added to the queues Credit. If the Credit is positive, then the queue can transmit one or more packets until the credit goes negative, or the queue runs out of packets. If, at the transmit opportunity the Credit is negative, it is not permitted to transmit on the cycle. Through careful assignment of Credit and Quantum values, bandwidth apportionment between the queues can be easily realized.

Control information is maintained at each selector, where the control information includes basic information for each queue input. In the example of FIG. 2, where N equals eight, the control information includes the fields illustrated below in Table I:

TABLE I

| Queue | Queue Style | Ready | Credit Value | Credit Quantum | Per Slot Vector <31:0> | Slot Style (B/P) |
|---|---|---|---|---|---|---|
| 0 | B | R(0) | C(0) | Q(0) | $Q_0$<31:0> | <31:0> |
| 1 | B | R(1) | C(1) | Q(1) | $Q_1$<31:0> | <31:0> |
| 2 | B | R(2) | C(2) | Q(2) | $Q_2$<31:0> | <31:0> |
| 3 | BE | R(3) | C(3) | Q(3) | $Q_3$<31:0> | <31:0> |
| 4 | P | R(4) | C(4) | Q(4) | $Q_4$<31:0> | <31:0> |
| 5 | P | R(5) | C(5) | Q(5) | $Q_5$<31:0> | <31:0> |
| 6 | P | R(6) | C(6) | Q(6) | $Q_6$<31:0> | <31:0> |
| 7 | P | R(7) | C(7) | Q(7) | $Q_7$<31:0> | <31:0> |

Control bits are provided for each of the eight Queue inputs Queue<7:0>. In general, queue 7 is a highest priority, and queue 0 is the lowest priority queue (although the priority of each balanced queue is identical). The queue style is either a Balanced queue, Priority queue or Best Efforts queue. According to one aspect of the invention, it is advantageous to group balanced queues such that all balanced queues are contiguous at the 'bottom' of the list of all queues.

In one embodiment, there are thirty-two identified time slots (transmit opportunities) which repeat indefinitely. The slot style field comprises thirty-two bits, with each bit defining the respective slot as either a balanced slot B or priority PTO slots P. The Per Slot vector <31:0> for the queue input comprises an activity bit for each slot, where the Activity bit indicates whether the queue can be considered as a source queue for the time slot. In one embodiment, a 'one' value indicates that the queue is assigned to the time slot, while a 'zero' value indicates that the queue is not assigned to the time slot.

A Ready bit is maintained for each queue. The Ready bit is set if the Queue is not empty and the Rate Limiter indicates that the queue is permitted to transmit. Alternatively, if rate limiters are used, the Ready bit may also be gated by the Credit Field 26a value being positive. The Credit Field of table I corresponds to the current value in Credit Field 26a of the queue descriptor 25. The Credit range generally falls in the range of +/− the size of the largest packet transmitted on the network. A queues' Credit Quantum is assigned according the bandwidth of the queue in balance with other Balanced Queues using known DRR quantum assignment techniques.

Figure 4:
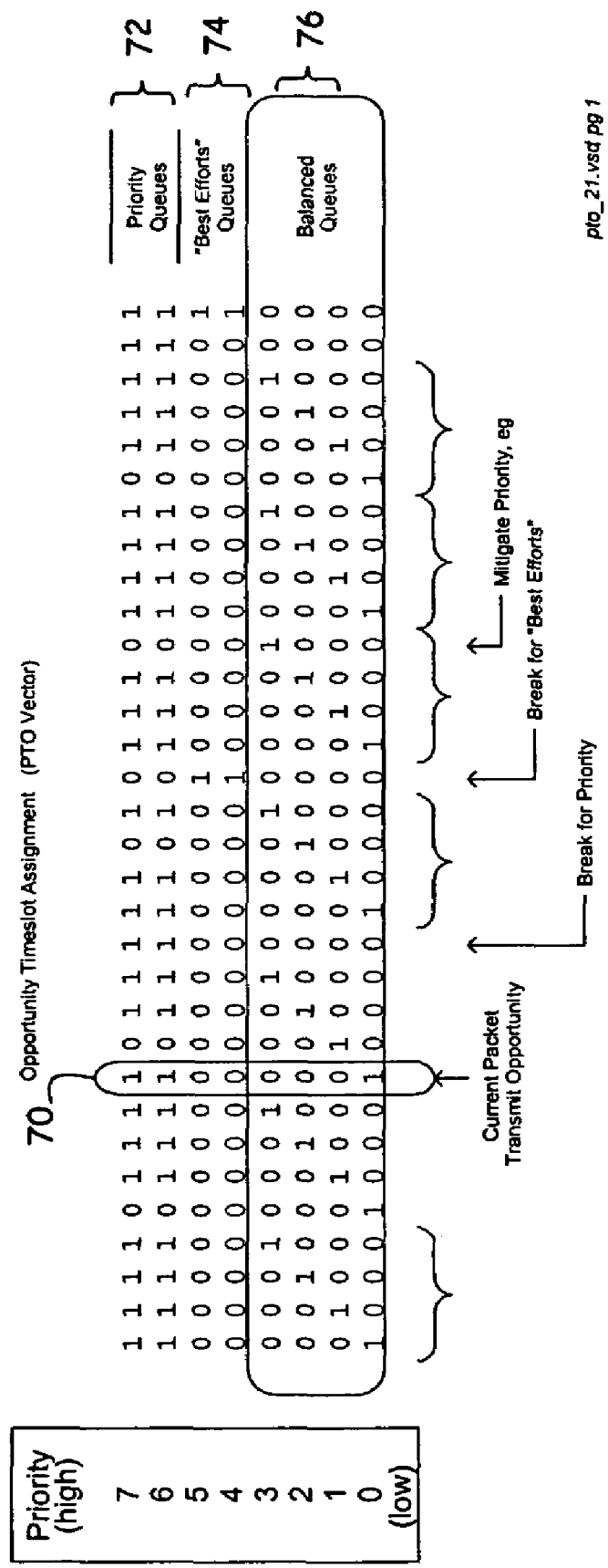
FIG. 4 is a diagram illustrating time slot selection masks that may be used to select one of the nested queues of FIG. 2 as a source for packet output.

Referring now to FIG. 4, exemplary PTO vectors are shown, wherein the PTO vector comprise the Activity bits for each queue input at the selector for a given time slot. The selector advances from the first time slot to the next only when certain considerations are met. In FIG. 4, Queues 0-3 are Balanced queues 76, Queues 4 and 5 are Best Effort queues 74, and Queues 6 and 7 are Priority queues 72. Note that multiple queues may be assigned to a common time slot, but only one Balanced queue is assigned to each time slot. For example, queues, queues 0, 6, and 7 each have their activity bit set during time slot 70. According to one aspect of the invention, if multiple queues that are each assigned to a specific time slot have a packet available for forwarding, certain rules are applied to determine which queue is permitted to transmit. The rules that are used are summarized below, and comprise packet selection rules, credit value rules and slot advancement rules.

Packet Selection Rules

Figure 5:
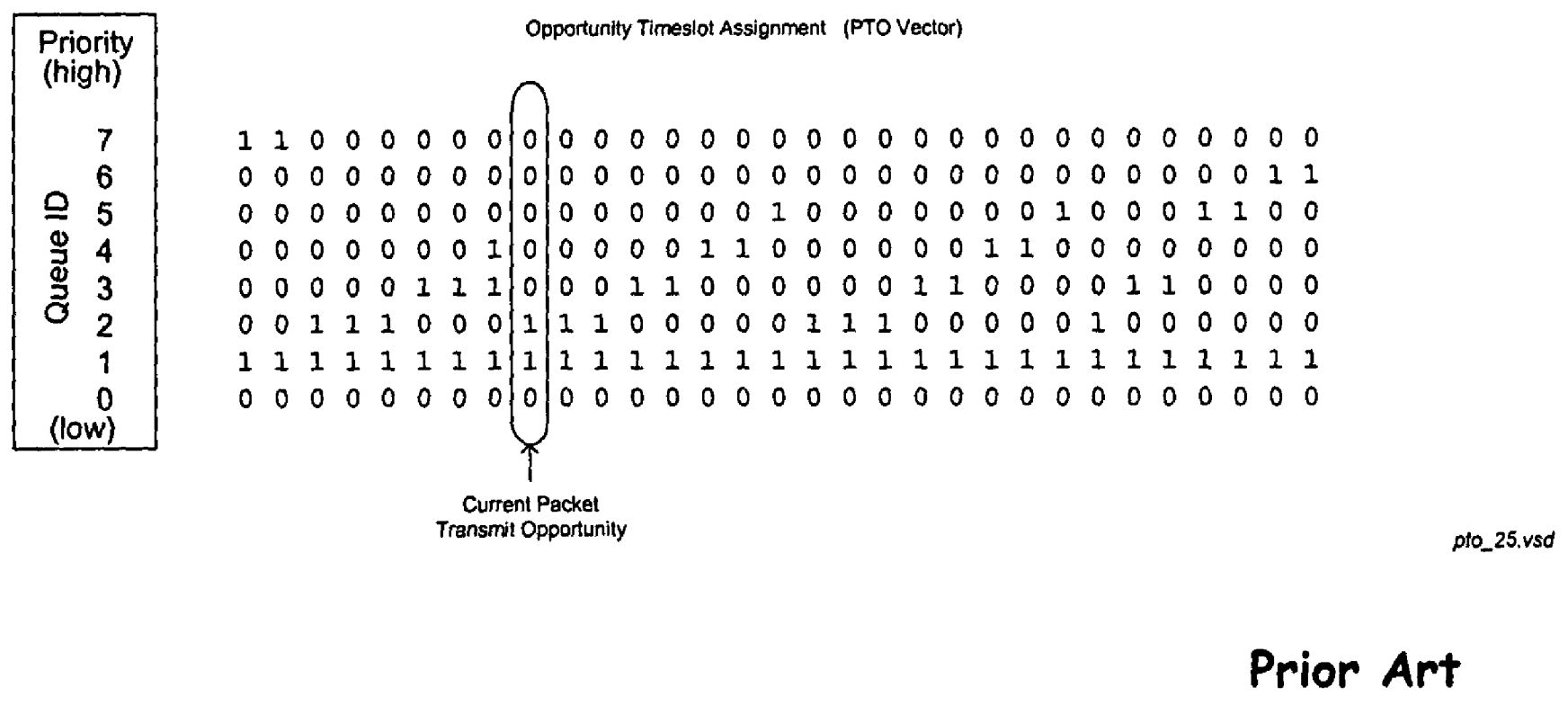

In general, the highest Priority packet queue that is Assigned to a time slot, and has is Ready is going to be selected as the source of a packet for the time slot. Such a selection criteria is similar to a prior art Packet Transmit Opportunity selection method, illustrated in FIG. 5. Each of eight queues (numbered 0-7 from lowest to highest priority) is assigned preference within the 32 timeslots as shown. Queue 6 is always serviced first (strict priority) and Queue 7 never receives priority unless all other queues assigned to a timeslot are empty. The remaining queues receive varying amounts of timeslot preference.

In the queue selection method of the prior art, within each time slot queues are selected strictly based on priority; there is no distinction between bandwidth balanced, best efforts or priority queues. As a result, there is also no Slot Style distinction. Thus, a packet is selected for dequeueing in strict priority from among those queues assigned to the current opportunity timeslot. The current timeslot number is a repeated, incrementing sequence ranging from 0 to 31. The current timeslot advances by 1 each time a packet is selected to dequeue (regardless of size). For each timeslot, an 8-bit vector programmed by the CPU assigns zero or more queues to the timeslot by setting the associated bit in the vector to a '1'. If none of the queues assigned to the timeslot has a packet to service, then the highest priority unassigned queue is serviced. Slot advancement does not occur in the prior art method until at least one queue is serviced. The main problem with the prior art method is that lower priority queues became starved for network resources, often causing queue backup and huge delay on messages forwarded via these queues. In addition, the prior art scheduling method is not data length aware, with no differentiation between short and long packets.

Referring back to FIG. 4, packet selection rules of the present invention overcome problem of the prior art implementation by providing a window in which balanced bandwidth traffic can be served, while still maintaining the service levels desired for high priority traffic. This is achieved by distinguishing both queue types and slot style types, and performing selections differently depending upon the relative styles of the queues and slots. In addition, a state bit of Some Balanced Queue Ready is maintained, which indicates that at least one of the Balanced queues has a packet to transmit.

The packet selection rules of the present invention operate as follows: Similar to the prior art and despite the Style Slot distinction, according to the selection rules if a Priority queue that is Assigned to the time slot is Ready, it will always be serviced. If the Slot Style is a Priority style, and no assigned Priority queue is Ready, then any Priority queue that is Ready is serviced. (This is also similar to the prior art). However, if the Slot Style is Balanced, and no Assigned Priority queue is Ready, then an Assigned Balanced Queue will be serviced before any Ready but unassigned Priority queue. In addition, if a slot is a Balanced Slot Style, and the assigned Balance Queue is not Ready, an unassigned Priority queue is Ready, but the Some Balanced Queue Ready indicator is set, then the unassigned priority queue will NOT be serviced. Rather, the time slot will advance to a time slot where the Balanced Queue that is Ready is Assigned, and it will be serviced. Thus, balanced bandwidth traffic will not be starved out by higher priority traffic.

The basic rules of packet selection are thus summarized below:

Rule 1: If (Slot Style=Priority)

Select packet from highest priority queue with Ready bit and Assigned bit set for the time slot. If no Priority Queue has Assigned bit set, select packet from highest priority queue having Ready bit set.

Rule 2: If (Slot Style=Balanced)

Select packet from highest priority queues with Ready and Assigned bit set for the time slot, then select packets from the single Balanced queue with the Assigned bit set if the Ready bit for the queue is set AND the Credit value of the queue is positive. Priority queues that are Not assigned are served in a Balanced slot only if "some balanced queue is ready" indicator is FALSE.

Credit Value Rules

As mentioned with regard to the DRR description above, Credit value rules define how Credits are assigned to Balanced queue fields and how and when Credit Quantums are added to the Credit balance. In one embodiment, the addition of Credit Quantums can be bypassed at a time slot, to preclude excessive build up of credit and subsequent burstiness. This may be done by setting a Credit Bypass value, which indicates a number of the balanced queues that are to have their Quantum withheld. The Credit Value Rules are detailed below:

Rule 3:

Upon first entry into a Balanced Slot, add the Credit Quantum to the Credit Value of the Assigned Queue unless its previous credit is positive or Quantums are withheld.

Rule 4:

If previous credit was positive and Quantum was withheld, set state to withhold Quantum on the next round of balanced queue processing.

Rule 5: If Ready bit of Assigned queue is not set, set Credit Value=0.

Rule 6: If Credit Value is negative, set Credit Value=0 if Assigned queue is the ONLY Balanced queue having Ready bit set.

Rule 7: If packet is provided from Balanced queue, subtract packet Length from the Credit Value.

Slot Advancement Rules

Slot advancement rules control how the selector steps though the PTO vectors. In general, whether the selector advances to the next opportunity timeslot depends upon the Slot Style of the PTO vector currently being processed. As stated above, in the prior art selection process of FIG. 5, slot advancement did not occur until a packet was sourced from one of the queues. Generally the queue ended up being a higher priority queue, and thus there was little recourse for lower priority queues to realize their intended network usage.

However, according to the present invention, slot advancement may occur even if a queue Assigned to the time slot has not provided data (because it was not Ready, and unassigned Priority queues are not Ready), if there is a Balanced queue that is Ready, but is not assigned to the current time slot. In addition, should be the Slot Style be Priority, and there are no Priority queues Ready, but there is an indication that one of the Balanced queues that is not assigned to the current time slot is Ready, the time slot advances until a time slot that Assigns the Ready Balanced queue is reached. Advancing the time slots in this manner helps to service balance queues and prevent starvation of network resources for the queue.

Note that with the below rules, Balanced Slots that are not Assigned or have insufficient Credit are skipped to allow other queues to be serviced, until sufficient credit for the Balanced queue is accumulated. A trade-off exists relative to Quantum size, some searching may occur if the quantum values are small (e.g., circulating among queues until credit is built up) while "burstiness" may occur if the quantum values are large. The Slot Advancement rules are detailed below:

Rule 8: If Slot Style is Priority, advance the slot if a packet is served OR if no packet is served and Some Balanced Queue is Ready; i.e., re-enter the current slot only if no queue is ready.

Rule 9: If Slot Style is Balances, advance the slot if a Priority queue is served. If the Assigned Balanced queue is served, re-enter the slot if it remains Ready and its Credit Value is positive.

Figure 6:
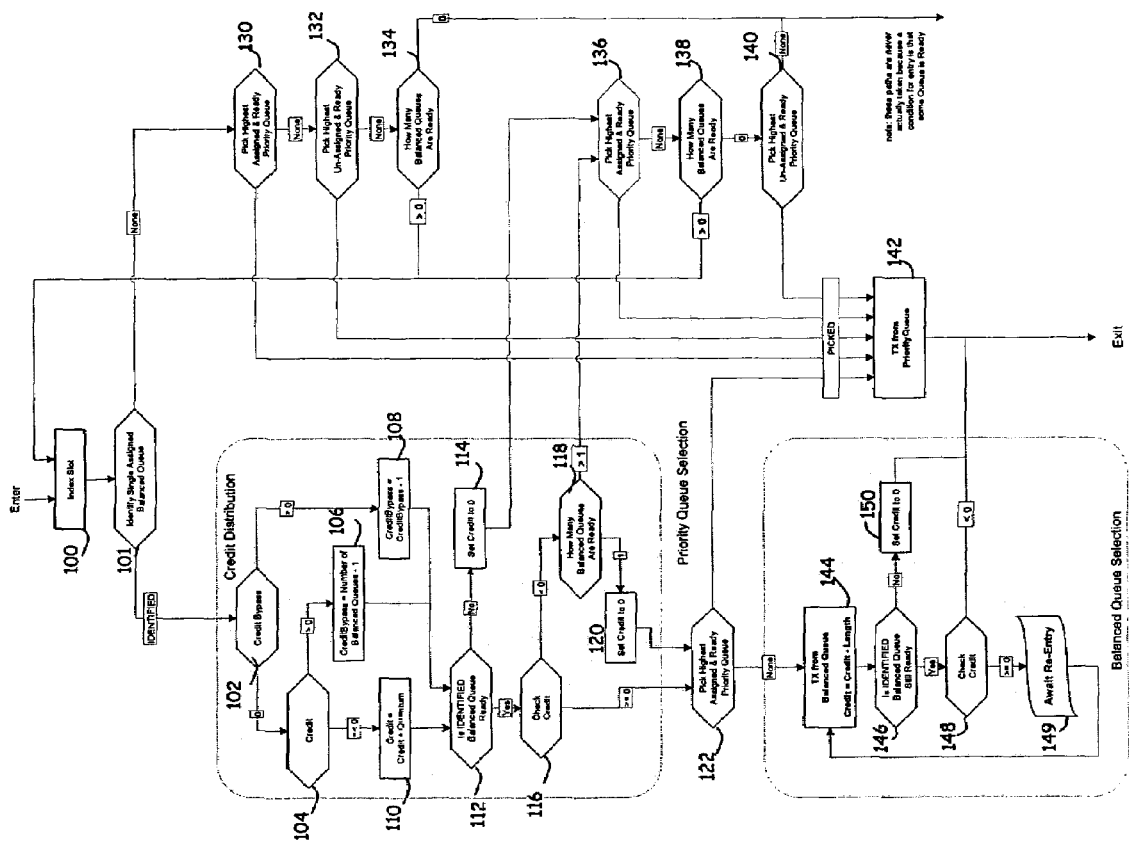
FIG. 6 is a flow diagram illustrating exemplary steps of the present invention for selecting one of the nested queues using the slot selection masks of FIG. 4.

Referring now to FIG. 6, a flow diagram illustrating one embodiment of the selection process performed at a selector is shown. At step 100, the current time slot is indexed. At step 101, it is determined whether there is an Assigned Balanced queue in the time slot. If there is one, then the process proceeds to Credit Distribution. At step 102 it is determined whether the Credit Quantum addition is bypassed for this time slot. In one embodiment, all balanced queues can be skipped for one round of credit giving, for N balanced slots by setting the Credit Bypass value equal to then Number of Balanced Queues−1. If the Credit Bypass is positive, then the addition of the Quantum to the Assigned Balanced Queue is skipped, and at step 108 the Credit Bypass value is set back to decremented. If at step 102 it was determined that the Credit Bypass is not zero, then at step 104 it is determined whether the Credit value is positive. Note that in DRR, the queue may transmit if the Credit is positive, so to prevent excessive Credit build-up, step 106 may optionally set the Credit Bypass to a predetermined number, indicating a number of future time slots to skip the Quantum addition.

If the Credit value was at step 104 is less than or equal to zero, the process proceeds to step 110, where the Quantum is added to the Credit value. Steps 110, 106 and 108 proceed to step 112, where it is determined whether the Assigned Balanced Queue is Ready. If the Balanced Queue is not Ready, then the process proceeds to step 114, where the Credit is set to zero, and then to step s136-140, where either one of the Priority queues is selected or it is determined to advance to a next time slot.

If it is Ready, at step 116 the Credit value is checked to see if it is positive (i.e., that the Balanced queue is permitted to transmit). If it is negative, then at step 118 it is determined whether any other of the Balanced Queues are ready. If other Balanced Queues are ready, the process proceeds to steps 136-140, where it is determined whether to service from one of the Priority Queues, or advance to a next time slot. If other Balanced Queues are not Ready, then at step 120, the Credit value for the Balanced queue is set to zero (which, as we will see, enables it to transmit if no Assigned Priority Queue is Ready).

If at step 116 it was determined that there was sufficient credit to permit the Balanced Queue to transmit, then first it must be determined whether there is an Assigned Priority Queue that is Ready. Steps 116 and 120 proceed to step 122 to determine this. If at step 122 it is determined that there is an Assigned Priority Queue that is Ready, the queue is selected at step 142.

Otherwise, if there is no Priority Queue that is Ready, and the Assigned Balanced queue is Ready, then at step 144 the Balanced queue is selected to transmit, and the Length is subtracted from the Credit. At step 146, it is determined whether the Balanced Queue is still Ready. If it is, then at step 148, the Credit is checked. If it is still positive, at step 149 the process waits to re-enter the same time slot, returning to step 100. If at step 150 it was determined that the Queue as not Ready, the Credit is set to zero for the queue. Steps 150 and 148 then exit the time slot process.

The above steps highlighted the balanced queue efforts of the selection process. If, however, it was determined at step 101 that no Balanced Queue was Assigned to the time slot, the process proceeded to step 130, where the highest Assigned and Ready Priority queue is selected for transmission. If no highest Assigned Priority queue is Ready, then at step 132 the highest Un-Assigned and Ready Priority queue is selected for transmission. If no Priority queues are Ready, then at step 134 it is determined whether any Balanced Queues are Ready. If the number is greater than zero, the process returns to step 100 to advance to the next time slot.

Thus a process has been shown and described that allows balanced bandwidth traffic to be serviced while still maintaining the service levels desired for high priority traffic, thereby providing balanced throughput. The above embodiment achieved the result by distinguishing both queue types and slot style types, and performing selections differently depending upon the relative styles of the queues and slots. This arrangement provides a number of advantages. Because the selection method is fast and relatively simple to implement, a large number of queues may be integrated into the decision process while maintaining a desired output bandwidth. In addition, the selection process provides a flexibility, allowing multiple traffic shaping considerations to be modified during operations to support changing network requirements. In addition, the design is scalable; to support higher bandwidth requirements more selectors are simply added at different stages at no increase to the complexity of the underlying logic.

For example, referring back briefly to FIG. 2, a three level selection mechanism is shown. The description herein has focused on what occurs at each individual level. By arranging the selectors in hierarchical layers, systems having varying numbers of output ports or performance requirements can be supported. Referring briefly to Table II below, a table of the selection mechanisms that would be provided at different levels to support the various architectures is provided.

TABLE II

| Architecture | 1st Level Selection | 2nd Level Selection | 3rd Level Selection |
|---|---|---|---|
| 1 10 × Gigabit Ethernet | Eight Queues Traffic Shaped into Virtual Sub-Ports | Further Aggregation and Shaping | One Queue gated by Flow Control from Device |
| Ten 1 × Gigabit Ethernet | Eight Queues Traffic shaped into virtual Sub-Ports | Ten Queues Gated by Flow Control from network device | Pure Round Robin Selection |
| Fourty Eight 10/100 Fast Ethernet | Forty eight queues gated by Flow control from network device | Pure Round Robin | Pure Round Robin |

Having described one embodiment of the invention, it should be understood that many modification may be made without altering its spirit and scope. For example, although the queueing method and apparatus has been shown as advantageous to a network environment, it is understood that it is equally advantageous in any environment that requires buffering of data. It is also envisioned that the various inputs to the selection criteria may be altered to incorporate additional queue types and varying sizes of inputs, and thus the present invention should not be limited by the above description, but rather only by the spirit and scope of the below claims.

What is claimed is:

1. A method for selecting one of a plurality of data sources as a source of data, wherein the data sources are apportioned into a first types of data source and a second type of data source, the method comprising the steps of:
   providing a plurality of vectors, each vector associated with one of the plurality of data sources, each vector comprising a series of N bits, where each bit corresponds to one of N time slots, each bit representing whether the associated one of the plurality of data sources is assigned to the corresponding time slot;
   determining, for each time slot, a slot style of the time slot; and
   selecting, at each time slot, one of the plurality of data sources as the source of data, the step of selecting operating in response to the slot style of the time slot and the plurality of vectors, wherein the step of selecting further operates in response to whether an assigned data source is ready.

2. The method according to claim 1, wherein the step of selecting further operates in response to a value of each bit associated with the time slot from each vector of the plurality of vectors.

3. The method according to claim 1, wherein the first type of data source is a priority queue, and wherein the step of selecting selects a highest priority queue that is assigned to the time slot and is ready.

4. The method according to claim 3, wherein the second type of data source is a balanced bandwidth queue, a subset of the plurality of data sources are balanced bandwidth queues, and at least one of the balanced bandwidth queues is assigned to the time slot, wherein the step of selecting selects the balanced bandwidth queue if the balanced bandwidth queue is ready and if no assigned priority queue is ready.

5. The method according to claim 4, wherein a Some Balanced Bandwidth queue indicator is provided to indicate whether one of the plurality of data sources.

6. The method according to claim 5, further comprising the step of advancing the time slot responsive to no assigned priority queue being ready, the assigned balanced bandwidth queue not being ready and the Some Balanced Bandwidth queue indicator being set.

7. The method according to claim 1, further comprising a third type of data source, wherein the third type of data source is a best effort queue, and wherein the step of selecting selects a best effort queue as the source of data for a time slot when none of the plurality of data queues assigned to the time slot are of the first data type or the second data type.

8. A queueing system comprising:
   a plurality of queues, each queue having a type associated therewith;
   a selector, coupled to the plurality of queues, the selector for selecting one of the plurality of queues to provide data to an output, the selector comprising a control structure including a plurality of vectors, each vector associated with one of the plurality of queues and comprising a number of bits corresponding to a number of time slots, wherein each of the time slots has a type associated therewith, wherein a set of the plurality of queues are assigned to each of the time slots, and wherein the selector selects, in response to whether a queue is ready, one of the plurality of queues to provide an output for each time slot based on the type of the each time slot, bit values in the plurality of vectors and the type of the queue.

9. The queuing system of claim 8, further comprising a rate limiter disposed between the plurality of queues and the selector.

10. The queueing system of claim 8, wherein the plurality of queues comprises a plurality of priority queues and a plurality of balanced bandwidth queues, wherein the selector further comprises an indictor for indicating that at least one of the plurality of the balanced bandwidth queues is ready to transmit data.

11. The queueing system of claim 10, wherein the selector operates to select a priority queue if the priority queue is ready and assigned.

12. The queueing system of claim 11, wherein the selector operates to select a priority queue if the priority queue is ready but not assigned, and the associated time slot stype is a priority time slot type.

13. The queueing system of claim 11, wherein the selector operates to select a balanced bandwidth queue if the assigned priority queue is not ready, and the balanced bandwidth queue is assigned and ready.

14. The queuing system of claim 13, wherein the selector operates to advance the time slot if the assigned priority queue is not ready, and the balanced bandwidth queue is assigned but not ready, and the indicator is set to indicate that at least one of the plurality of balanced bandwidth queues is ready.

15. A network line card comprising:
   an ingress data path for forwarding a packet from a device to a fabric;
   an egress data path for forwarding a packet from a fabric to a device, the egress data path comprising a queueing system, the queueing system comprising:

a plurality of queues, each queue having a type associated therewith;

a selector, coupled to the plurality of queues, the selector for selecting one of the plurality of queues to provide data to an output, the selector comprising a control structure including a plurality of vectors, each vector associated with one of the plurality of queues and comprising a number of bits corresponding to a number of time slots for indicating an availability of the time slot to the associated queue, wherein each of the time slots has a type associated therewith, wherein a set of the plurality of queues are assigned to each of the time slots, and wherein the selector selects, in response to whether a queue is ready, one of the plurality of queues to provide an output for each time slot based on the type of the each time slot, bit values for the each time slot in the plurality of vectors and the type of the queue.

16. The network line card of claim 15, wherein the queueing system further comprises a rate limiter disposed between the plurality of queues and the selector.

17. The network line card of claim 15, wherein the plurality of queues comprises a plurality of priority queues and a plurality of balanced bandwidth queues, wherein the selector further comprises an indictor for indicating that at least one of the plurality of the balanced bandwidth queues is ready to transmit data.

18. The network line card of claim 17, wherein the selector operates to select a priority queue if the priority queue is ready and assigned.

19. The network line card of claim 17, wherein the selector operates to select a priority queue if the priority queue is ready but not assigned, and the associated time slot stype is a priority time slot type.

20. The network line card of claim 19, wherein the selector operates to select a balanced bandwidth queue if the assigned priority queue is not ready, and the balanced bandwidth queue is assigned and ready.

21. The network line card of claim 20, wherein the selector operates to advance the time slot if the assigned priority queue is not ready, and the balanced bandwidth queue is assigned but not ready, and the indicator is set to indicate that at least one of the plurality of balanced bandwidth queues is ready.

* * * * *